(12) United States Patent
Kuhns

(10) Patent No.: US 6,354,655 B1
(45) Date of Patent: Mar. 12, 2002

(54) DASHBOARD ASSEMBLY FOR A WORK MACHINE

(75) Inventor: Stanley G. Kuhns, Decatur, IL (US)

(73) Assignee: Caterpillar S.A.R.L., Geneva (CH)

( * ) Notice: Subject to any disclaimer, the term of this patent is extended or adjusted under 35 U.S.C. 154(b) by 0 days.

(21) Appl. No.: 09/607,297

(22) Filed: Jun. 30, 2000

(51) Int. Cl.⁷ .............................................. B62D 25/14
(52) U.S. Cl. .................... 296/190.09; 296/70; 296/188; 296/208; 180/90
(58) Field of Search ........................ 296/70, 188, 208, 296/190.09, 190.08; 180/90

(56) References Cited

U.S. PATENT DOCUMENTS

| | | | |
|---|---|---|---|
| 3,876,228 A | * | 4/1975 | Hawkins et al. |
| 4,372,412 A | | 2/1983 | Fujii et al. |
| 4,455,338 A | * | 6/1984 | Henne |
| 4,717,195 A | | 1/1988 | Okuyama et al. |
| 4,909,566 A | * | 3/1990 | Hashimoto et al. ....... 296/70 X |
| 5,311,960 A | | 5/1994 | Kukainis et al. |
| 5,354,114 A | | 10/1994 | Kelman et al. |
| 5,358,300 A | * | 10/1994 | Gray ........................ 296/70 X |
| 5,387,023 A | | 2/1995 | Deneau |
| 5,549,344 A | | 8/1996 | Nishijima et al. |
| 5,556,153 A | | 9/1996 | Kelman et al. |
| 5,580,081 A | | 12/1996 | Berg et al. |
| 5,676,216 A | * | 10/1997 | Palma et al. ................... 180/90 |
| 5,678,877 A | | 10/1997 | Nishijima et al. |
| 5,762,395 A | | 6/1998 | Merrifield et al. |
| 5,857,726 A | | 1/1999 | Yokoyama et al. |
| 5,938,266 A | | 8/1999 | Dauvergne et al. |
| 5,997,078 A | | 12/1999 | Beck et al. |

FOREIGN PATENT DOCUMENTS

| | | |
|---|---|---|
| EP | 0 036 925 | 10/1981 |
| WO | WO 97/49599 | 12/1997 |

* cited by examiner

Primary Examiner—Joseph D. Pape
(74) Attorney, Agent, or Firm—James R. Smith; Finnegan, Henderson, Farabow, Garrett & Dunner, L.L.P.

(57) ABSTRACT

In the operation of work machines, it has been a problem providing a dashboard with sufficient durability to withstand the oftentimes rigorous operating environments and which does not require the use of metal brackets for support. The present invention provides for a dashboard which has a front portion and a reinforcing structure attached to the front portion.

15 Claims, 2 Drawing Sheets

DASHBOARD ASSEMBLY FOR A WORK MACHINE

TECHNICAL FIELD

This invention relates generally to a dashboard assembly for a work machine and more specifically a dashboard assembly for a work machine equipped with a plenum for transporting air.

BACKGROUND ART

Dashboards are commonly used to house the various components comprising heating, ventilation, and air conditioning components found within the cab structures of some vehicles as well as to provide a supporting structure on which to mount an instrument panel. The instrument panel, in turn, is typically used to mount a variety of such as a tachometer, speedometer, engine gages, and the like used by the operator to assess various vehicle conditions Work machine dashboards typically must support numerous components as well as withstand the rigors associated with rough terrain in which work machines operate. To provide sufficient support to dashboards used in work machines, metal brackets are typically used which attach the dashboard to the cab frame structure. However, one disadvantage in using metal brackets is that the metal brackets only provide direct localized support of the dashboard and not full support for those areas of the dashboard requiring needed support. A second disadvantage in using metal brackets is possible fouling of the brackets caused by the close proximity of the electrical component wiring which can cause bracket failure if not regularly inspected. In addition, separate hoses and clamps are often needed to connect the plenum of the HVAC system to the air ducts provided in the dashboard and instrument panel requiring their individual removal in order to remove the instrument panel from the dashboard for maintenance or repairs. Different types of dashboards have been employed in the past in an attempt alleviate the aforementioned problems. Example of such prior art attempts are U.S. Pat. No. 5,762,395 for a Molded Cross Car Support Structure, issued to Merrifield et al. on Jun. 9, 1998, and U.S. Pat. No. 5,556,153 for a Instrument Panel Assembly, issued to Kelman et al on Sep. 17, 1996. Such patents utilize separate air distribution pieces which either match or aligned with air distribution ducts or channels provided in the instrument panel or dashboard, thereby cooperatively channeling air into the cab structure.

While prior dashboard assemblies satisfactorily perform their intended tasks, the need to provide an intermediate piece, separate from the dashboard, for support and air distribution may increase the costs for the dashboard assembly as well as increase the time for maintenance and repair. The present invention is directed at overcoming one or more of the problems set forth above.

DISCLOSURE OF THE INVENTION

In one aspect of the invention, a dashboard assembly for a work machine of the type having a plenum for transporting air is provided. The dashboard arrangement consists of a dashboard which has a front portion, and a reinforcing structure that is attached to the front portion.

In another aspect of the present invention, a method of reinforcing a dashboard assembly is provided. The aforementioned method includes the steps of providing a dashboard, providing a reinforcement structure; and adhesively attaching said reinforcing structure with said dashboard.

BEST MODE FOR CARRYING OUT THE INVENTION

Figure 1:
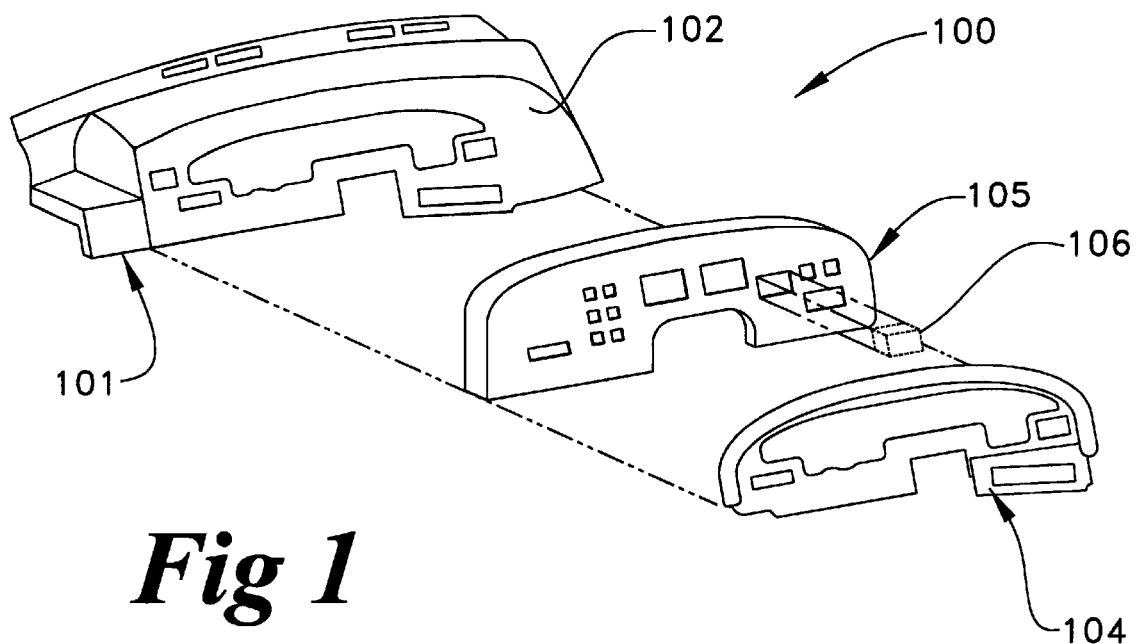
FIG. 1 is an perspective view of a dashboard assembly that embodies the principles of the present invention.

Referring to the drawings, a dashboard assembly 100 is shown in FIG. 1 that includes a dashboard 101, having a front portion 102, and a reinforcing structure 104. The dashboard assembly 100 also includes an instrument panel 105 for receiving a plurality of components designated generally herein by reference numeral 106 which are used to communicate to the operator operating conditions of the various systems on board a work machine. The instrument panel 105 is attached to the front portion 102 of the dashboard 101 by use of a plurality of fasteners (not shown). The dashboard assembly 100 is typically mounted inside the cab structure (see FIG. 3, reference numeral 300) of a work machine in close proximity to the area normally occupied by the work machine operator.

Figure 2:
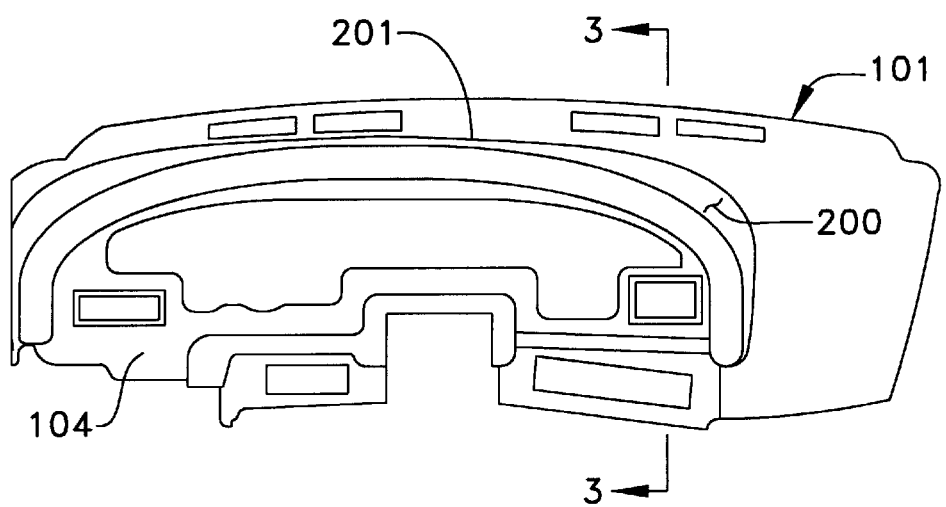
FIG. 2 is a diagrammatic elevation view of the dashboard assembly showing the attachment location of the reinforcing structure to the rear face of the dashboard.

With reference now to FIG. 2, the reinforcing structure 104 preferably comprises a plastic-type material which is attached, preferably adhesively, to a rear face 200 of the front portion 102. Attachment of the reinforcing structure 104 to the rear face 200 is preferably accomplished by means of a methlene chloride slurry which is applied to the both the rear face 200 and reinforcing structure, thereby creating a solvent bond or adhesively bonding the two together. Furthermore, to provide support to substantially the entire front portion 102, it is preferred that the reinforcing structure 104 be attached substantially about the perimeter 201 of the front portion 102.

Figure 3:
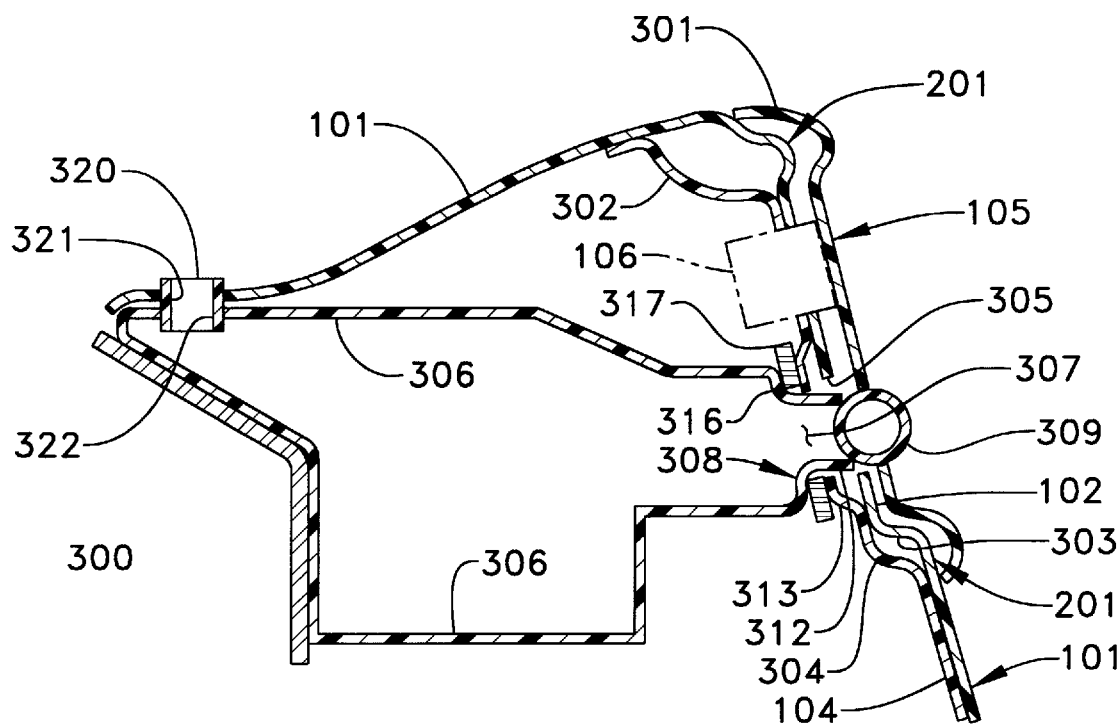
FIG. 3 is a diagrammatic section view of the dashboard assembly taken along lines 3—3 of FIG. 2.

Referring now to FIG. 3, the dashboard 101 preferably comprises a plastic material formed by any suitable process such as vacuum forming, and is attached to the cab structure 300 (shown in phantom detail) at selected locations by use of mechanical fasteners (not shown). The dashboard 101 is provided with a pre-determined radius of curvature such that when the dashboard 101 is attached to the cab structure 300, the front portion 102 forms a concave surface, relative to the area normally occupied by the work machine operator. As should be appreciated, by providing the dashboard with the aforementioned curvature, the operator may have a clearer, more direct view of the various components 106 mounted on the instrument panel 105.

As will be apparent to those skilled in such art as this disclosure progresses, the reinforcing structure 104 is constructed in such manner so as to provide support to those areas of the dashboard 101 which may be subject to the most or different loads than experienced by other portions of the dashboard 101. Such areas may include the perimeter 201 of the front portion 102 and those other portions of the dashboard 101 which undergo abrupt directional changes. For example, integrally formed as part of the dashboard 101 is a protruding brow portion 301. To assist in withstanding the downward forces acting upon the dashboard due to the weight of the various components 106 and the instrument panel 105, the reinforcing structure 104 includes a reinforcing structure ridge portion 302 which is oppositely arranged (e.g., oppositely protruding) from the brow portion 301 when the reinforcing structure 104 is attached to the dashboard 101 in the aforementioned manner. Another example of other portions of the dashboard 101 which may require additional is the lower ridge portion 303. To reinforce this portion, a reinforcing structure lower ridge portion 304 may also be provided which is oppositely arranged (e.g., oppositely protruding) from the lower ridge portion 303 when the reinforcing structure 104 is attached to the dashboard 101 in the aforementioned manner.

Dashboard openings 305 are provided in the dashboard 101 to allow unobstructed air flow from the work machines heating, ventilation, and air conditioning system to reach the operator by way of the plenum 306 (shown in phantom detail). As shown, each dashboard opening 305 is sized and located to overlay a corresponding plenum opening 307 provided in the plenum opening structure 308. Similarly, the reinforcing structure 104 is provided with reinforcing structure openings 312 each of which is sized and arranged to receive a corresponding plenum opening structure 308.

Each reinforcing structure opening 312 is provided with a flange portion 313 which is sized and arranged to lie adjacent a shoulder portion 316 of the plenum opening structure 308. The plenum opening structure 308, in turn, is arranged to cooperatively and sealingly register with duct opening structures 309 provided in the instrument panel 105. To maximize the amount of air reaching the operator, a sealing structure 317, preferably comprising a foam material, is interposed between the flange portion 313 and the shoulder portion 316. Furthermore, a louver with corresponding sealing structure, both designated by reference numeral 320, may be used to couple dashboard top openings 321 with plenum top openings 322 used, for example, to direct air to the windshield (not shown).

Figure 4:
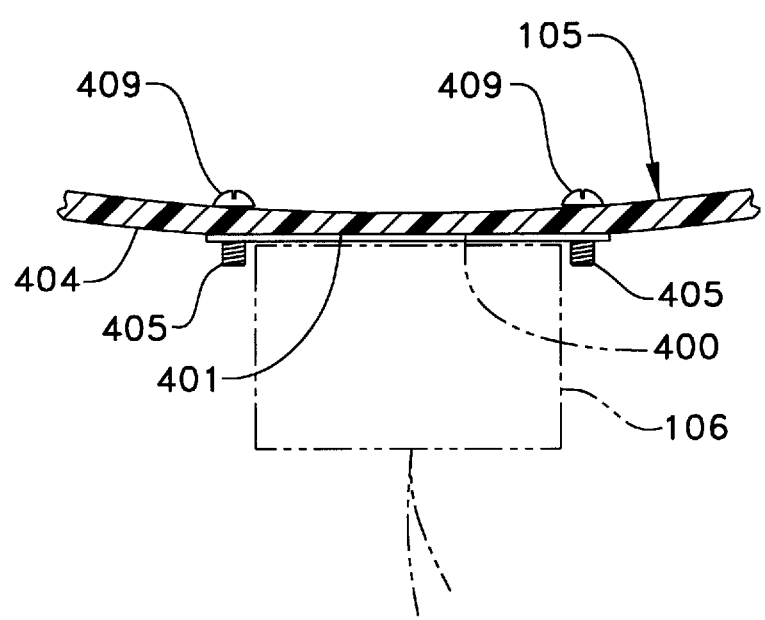
FIG. 4 is a diagrammatic top view, in cross section, of a component as attached to the instrument panel.

Referring now to FIG. 4, an exemplary arrangement for attaching the components 106 to the instrument panel 105 is shown. It is preferred that the instrument panel 105 also be provided with a predetermined radius of curvature which is substantially equal to that of the dashboard 101. As should be appreciated by those skilled in such art, in order to mount typically planer flat components 106 (e.g., with the plane defined by the component flange portion 400) to the curved instrument panel 105, the instrument panel 105 may be provided with corresponding planar flat recessed portions 401 formed within the back surface 404 of the instrument panel 105. In addition, to allow for proper engagement of the mounting screws 405 with the components 106, the instrument panel 105 may provide for appropriately oriented countersunk fastener openings (not shown) to accommodate the fastener head portion 409. Alternatively, a platform (not shown) may be formed as part of the instrument panel 105 in such manner as to form an elevated structure, relative to the back surface 404, thereby providing a planar flat platform on which to mount the components 106.

INDUSTRIAL APPLICABILITY

The attachment of the reinforcing structure 104 to the dashboard 101 allows for an alternative to the traditional methods of support such as, for example, metal brackets (not shown) which typically had to extend from and area adjacent the instrument panel 105 to the cab structure 300. The reinforcing structure 104 provides needed support for those areas of the dashboard 101 which may be subjected to impacts or loads not encountered by other areas of the dashboard 101. For example, the brow portion 301 must withstand the cantilever loads associated with the weight of the instrument panel 105 as well as the components 106 attached therewith.

The protruding ridge portions 302,304 of the reinforcing structure 104 provide support for those areas of the dashboard 101 that experience increased loads, relative to the remainder of the dashboard 101, or undergo abrupt directions changes in construction. The remaining portions of the reinforcing structure 104 which do not protrude in an opposite manner as the corresponding portions of the dashboard 101 preferably remain in contact with the dashboard 101, thereby providing an overall composite structure stronger than either respective piece alone. The flange portions 313 provides a means to cooperatively register with the shoulder portions 316, thereby preventing the loss of air from the work machines heating, ventilation, and air conditioning system. A sealing structure 317 may be interposed between each flange portion 313 and corresponding shoulder portion 316.

What is claimed is:

1. A dashboard assembly for a work machine having a plenum for transporting air, the plenum having a plenum opening structure, comprising:

a dashboard having a front portion;

a reinforcing structure attached to said front portion; and a sealing structure disposed between said reinforcing structure and said plenum opening structure.

2. The dashboard assembly of claim 1 wherein said reinforcing structure is adhesively attached to said dashboard.

3. The dashboard assembly of claim 1 wherein:

said front portion has a perimeter; and said reinforcing structure is attached to a rear face of said front portion about said perimeter.

4. The dashboard assembly of claim 1 wherein:

said dashboard includes a protruding brow portion; and said reinforcing structure includes a reinforcing structure ridge portion oppositely arranged from said brow portion when said reinforcing portion is attached to said dashboard.

5. The dashboard assembly of claim 1 wherein said dashboard includes at least one dashboard opening adapted for overlying said plenum opening structure.

6. The dashboard assembly of claim 5 wherein said reinforcing structure includes a reinforcing structure opening adapted to receive said plenum opening structure.

7. The dashboard assembly of claim 1 wherein said dashboard has a predetermined radius of curvature.

8. The dashboard assembly of claim 1 including an instrument panel adapted to receive a plurality of components; and wherein said instrument panel has a predetermined radius of curvature and is adapted to receive a substantially planar component.

9. The dashboard assembly of claim 8 wherein a back surface of said instrument panel includes a planar flat recessed portion adapted to receive the component.

10. The dashboard assembly of claim 9 wherein a back surface of the instrument panel includes a planar platform adapted to receive the component.

11. The dashboard assembly of claim 1 wherein said dashboard and said reinforcing structure comprise a plastic material.

12. A dashboard system, comprising:

a work machine having a cab structure;

a plenum having a plurality of plenum opening structures and attached with said cab structure;

a dashboard having a front portion defined by a perimeter and attached with said cab structure, said front portion having a rear face and a brow portion attached therewith, and said dashboard having a plurality of dashboard openings arranged to overlay said plenum opening structures;

a reinforcing structure attached to a rear face of said front portion about said perimeter, said reinforcing structure having reinforcing structure openings each adapted to receive a corresponding plenum opening structure;

a sealing structure interposed between each said reinforcing structure and at least one said plenum opening structure;

an instrument panel attached to said front portion of said dashboard, said instrument panel having a plurality of instrument panel openings adapted to overlay a corresponding said plenum opening structures; and a plurality of components mounted to said instrument panel.

13. The dashboard of claim 12 wherein said instrument panel is adapted to receive a plurality of planar flat components.

14. The dashboard assembly of claim 12 wherein:

said dashboard and said instrument panel has a predetermined radius of curvature.

15. A dashboard assembly for a work machine having a plenum for transporting air, comprising:

a dashboard having a front portion, said dashboard including at least one dashboard opening adapted for overlying a corresponding plenum opening structure;

a reinforcing structure attached to said front portion, said reinforcing structure including a reinforcing structure opening adapted to receive a corresponding plenum opening structure; and a sealing structure interposed between said reinforcing structure and said plenum opening structure.

* * * * *